United States Patent
Armstrong (10) Patent No.: US 7,584,119 B2
(45) Date of Patent: *Sep. 1, 2009

(54) RESTAURANT SYSTEM

(76) Inventor: Mark Armstrong, 8251 Shell Beach Ct., Las Vegas, NV (US) 89117

( * ) Notice: Subject to any disclaimer, the term of this patent is extended or adjusted under 35 U.S.C. 154(b) by 20 days.

This patent is subject to a terminal disclaimer.

(21) Appl. No.: 11/688,278

(22) Filed: Mar. 20, 2007

(65) Prior Publication Data
US 2008/0235097 A1 Sep. 25, 2008

(51) Int. Cl.
*G06Q 30/00* (2006.01)
*G06Q 20/00* (2006.01)

(52) U.S. Cl. .......................... 705/15; 705/16
(58) Field of Classification Search ............... 705/15, 705/16
See application file for complete search history.

(56) References Cited

U.S. PATENT DOCUMENTS

| | | | |
|---|---|---|---|
| 5,692,342 A * | 12/1997 | Devlin, Jr. ................ 52/36.1 |
| 6,866,511 B1 * | 3/2005 | Harris et al. ................ 434/219 |
| 6,913,165 B2 * | 7/2005 | Linz et al. .................... 220/568 |
| 2002/0038165 A1 * | 3/2002 | McHale et al. .............. 700/216 |
| 2005/0194402 A1 * | 9/2005 | Morrison ..................... 222/113 |
| 2006/0166716 A1 * | 7/2006 | Seshadri et al. .......... 455/575.2 |
| 2007/0240077 A1 * | 10/2007 | McCarthy et al. ........... 715/802 |

\* cited by examiner

*Primary Examiner*—Elaine Gort
*Assistant Examiner*—Harshad Parikh
(74) *Attorney, Agent, or Firm*—Dale J. Ream (57) ABSTRACT

A restaurant system includes an electronic kiosk having opposed first and second sides. A first display is situated on the first side for use by the customer and a second display is situated on the second side for use by a bartender. The kiosk includes a first input device for use by the customer. A processor is in data communication with the displays and the first input device to retrieve data from the first input device, such as a drink order, and actuate the first and second displays. A user may select between inputting ordering options, watching television/video, or allowing advertisements to be displayed on the first display. Drink recipes may be displayed on the second display to aid a bartender in mixing drinks. The system may include a remote headset for audibly assisting a bartender with drink orders and may include an electronic mixing tin and lighted pour spout.

18 Claims, 9 Drawing Sheets

RESTAURANT SYSTEM

BACKGROUND OF THE INVENTION

This invention relates generally to restaurant ordering systems and, more particularly, to a restaurant system that incorporates innovative media and advertising components, mixed drink preparation devices, and a wireless headset component.

Most restaurants share several common goals, such as providing accurate and efficient service as well as providing an enjoyable dining experience. When either goal is not met, the customers may be dissatisfied and may not return to the restaurant with any frequency or, worse yet, may not return at all. Some restaurants are successful with efficiency or with providing a friendly and enjoyable dining experience but few satisfy both goals fully or regularly. Other restaurants, particularly bars and casinos provide bartending with so-called "flair" techniques, e.g. tossing or spinning liquor containers prior to or in the process of preparing mixed drinks.

Various electronic devices have been proposed in the art for either improving the efficiency of ordering or order fulfillment, such as by increasing speed or accuracy or both. Although assumably effective for their intended purposes, the existing devices do not maximize the entertainment value to customers while simultaneously assisting bartenders, kitchen staff, waiters, etc. with accurately and quickly preparing mixed beverages or food items.

Therefore, it would be desirable to have a restaurant system having an electronic kiosk that may operate as a napkin dispenser or other condiment dispenser as well as an electronic display device. Further, it would be desirable to have a restaurant system having a database of drink recipes and one or more audio or visual means of communicating the recipes to a bartender. In addition, it would be desirable to have a restaurant system having innovative electronic mixing tins or pour spout devices for entertaining restaurant patrons while mixing beverages.

SUMMARY OF THE INVENTION

Accordingly, a restaurant system according to the present invention includes an electronic kiosk having generally opposed first and second sides. A first display may be situated on the first side of the kiosk for use by the customer and a second display may be situated on the second side of the kiosk for use by a bartender. The electronic kiosk includes a first input device for use by the customer. A processor is in data communication with the first and second displays and with the first input device to retrieve data from the first input device and to actuate the first and second displays. As the first input device may be a touch screen display interface, a restaurant patron may select from food or drink ordering options, may choose to watch television or other special programming, or just allow advertisements to be displayed. The first input device may also include a card reader for receiving payment.

The kiosk defines a storage area that is configured to contain napkins or condiments. The kiosk may include a second input device for use by a bartender, such as a touch screen. The second display may be in communication with a processor for displaying selected drink recipes. Thus, a user selects a desired drink using the first display, the corresponding drink recipe may be displayed on the second display to aid the bartender in fulfilling the order. In another aspect of the invention, the bartender may wear a headset remote from the processor to which the drink recipe may be transmitted and audibly recited into the bartender's ears to assist in preparing the drink.

The system may also include an innovative electronic mixing tin for providing a bartender with instant access to drink recipes while also increasing the ambiance of the bar and entertainment value of watching a bartender mix drinks. Specifically, the mixing tin may include an LCD screen on its exterior by which to display drink recipes or even advertisements and lighting displays.

Another aspect of the restaurant system includes a pour spout for attachment to liquor bottles that may be lit up with LED's. This component of the system would be especially effective when used with "flair" bartending techniques but also provides enhanced ambiance to any bar environment.

Therefore, a general object of this invention is to provide a restaurant system for improving order and order fulfillment efficiency as well as improving a restaurant's ambiance and entertainment value.

Another object of this invention is to provide a restaurant system, as aforesaid, that provides an interactive media and ordering component to a restaurant patron and an order fulfillment component to a restaurant employee.

Still another object of this invention is to provide a restaurant system, as aforesaid, in which a napkin or condiment dispenser includes one or more electronic displays.

Yet another object of this invention is to provide a restaurant system, as aforesaid, that includes a remote headset for audibly reciting mixed drink recipe instructions to a bartender.

A further object of this invention is to provide a restaurant system, as aforesaid, having electronic mixing tin and pour spout devices for enhancing the ambiance and entertainment value of a bar or restaurant environment.

A still further object of this invention is to provide a restaurant system, as aforesaid, that provides new and exciting opportunities for options for presenting advertising messages, food/drink specials, schedules, etc. to patrons of a restaurant.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a top view of the pour spout device as in FIG. 4a;

FIG. 5a is a sectional view taken along line 5a-5a of FIG. 4b;

FIG. 5b is an isolated portion on an enlarged scale of the pour spout device taken from FIG. 5a;

DESCRIPTION OF THE PREFERRED EMBODIMENT

A restaurant system 100 according to the present invention will now be described in detail with reference to FIGS. 1 through 9 of the accompanying drawings. More particularly, a restaurant system 100 (which may also be referred to herein as a bar system) according to the current invention includes an electronic kiosk 110.

Figure 6:
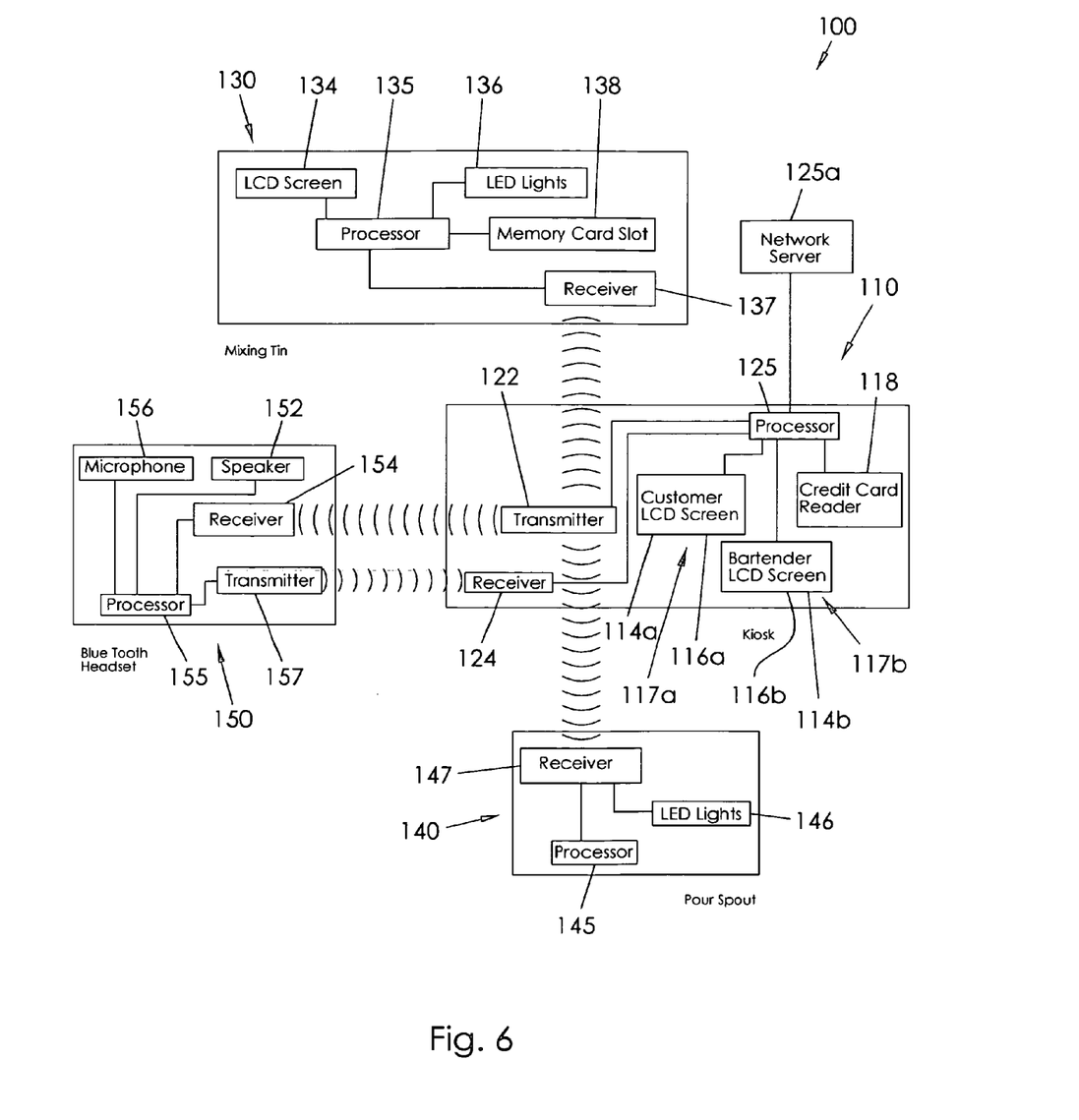
FIG. 6 is a block diagram of the electronic components according to the preferred embodiment of the restaurant system.
Figure 7A:
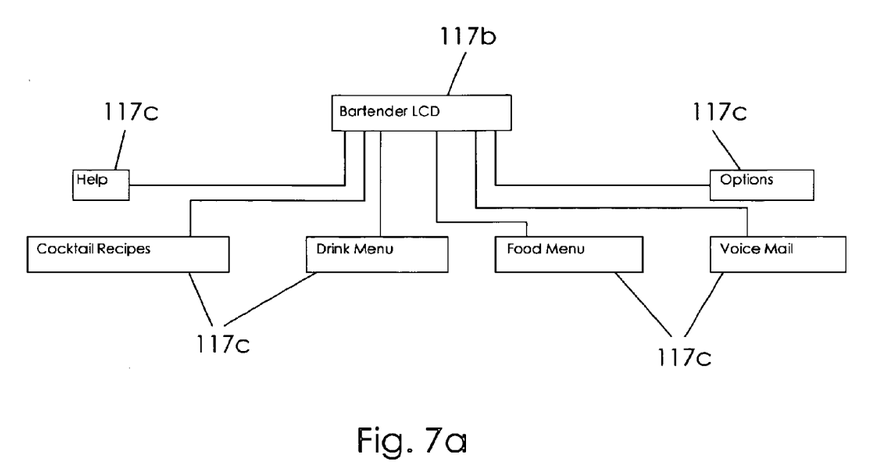
FIG. 7a is a block diagram illustrating the display options provided by the touch screen bartender display.
Figure 7B:
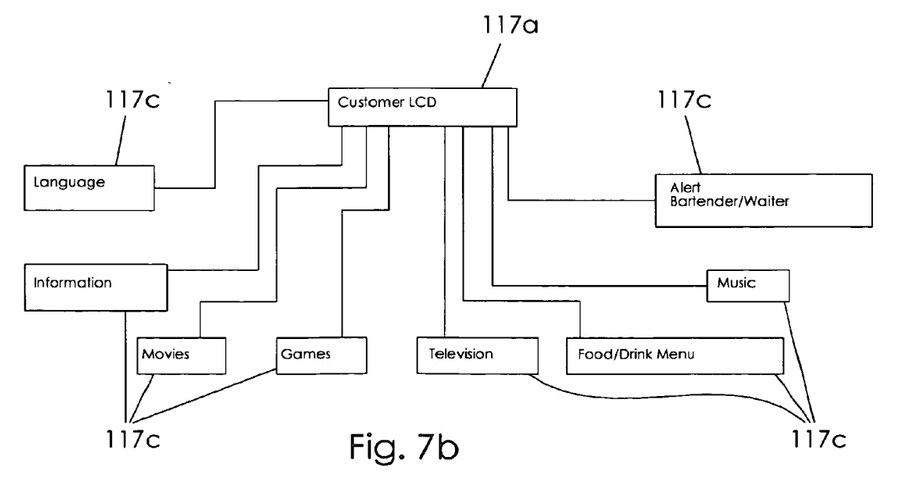
FIG. 7b is a block diagram illustrating the display options provided by the touch screen customer display.

The electronic kiosk 110 has generally opposed sides 112a, 112b. A display 114a may be on the side 112a for use by a customer, and another display 114b may be on the side 112b for use by a bartender. The electronic kiosk 110 may include an input device 116a for use by the customer and/or an input device 116b for use by the bartender (FIG. 6). As shown in FIG. 6, a touch screen 117a may serve as both the display 114a and the input device 116a, and a touch screen 117b may serve as both the display 114b and the input device 116b. FIGS. 7a and 7b show various predetermined (and non-exclusive) input and display options 117c that may be associated with the touch screens 117a, 117b, respectively. Alternately, or additionally, at least one input device 116a, 116b may include a card reader 118 for receiving payment.

Figure 1:
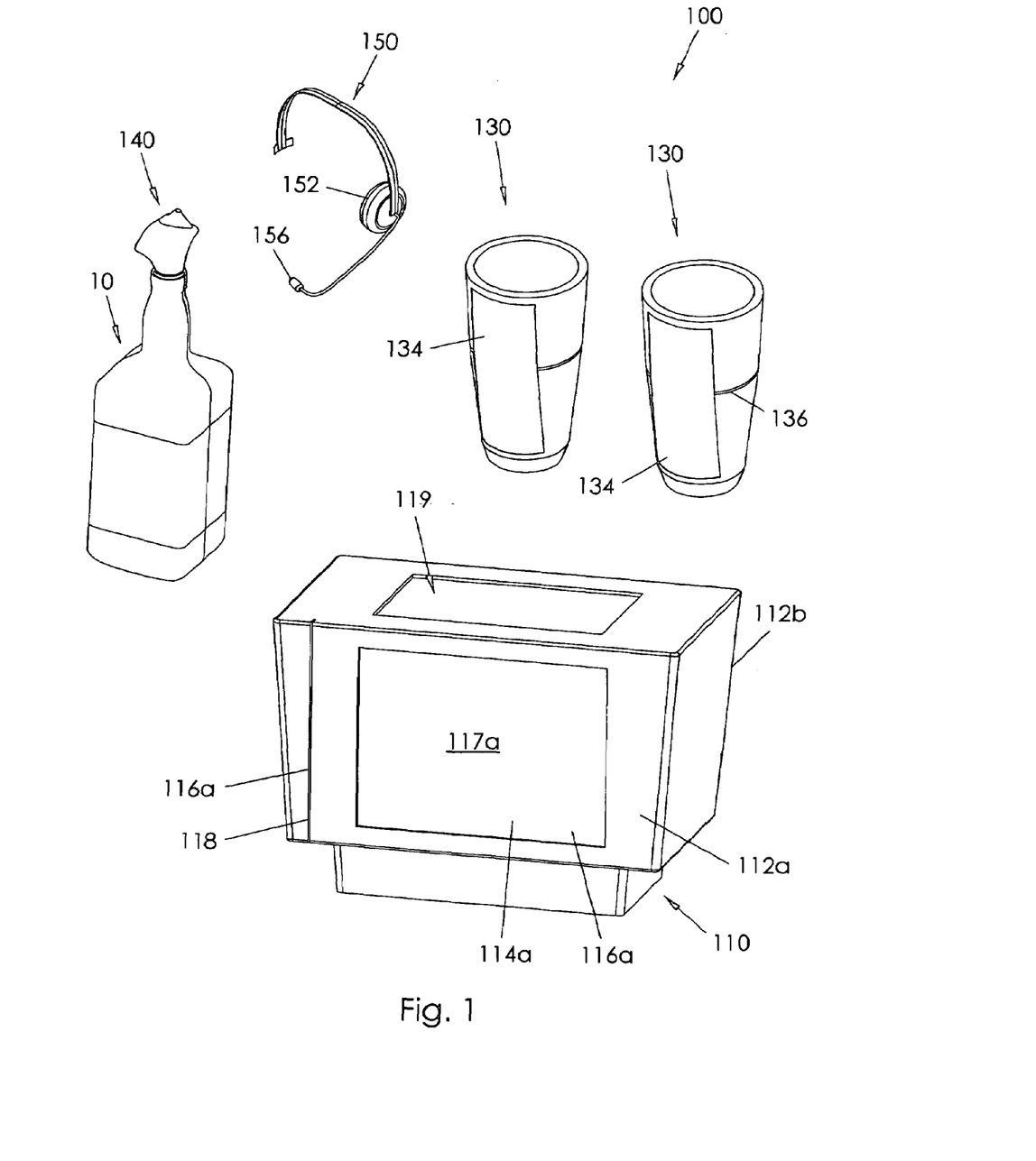
FIG. 1 is a perspective view of a restaurant system according to a preferred embodiment of the present invention.
Figure 2:
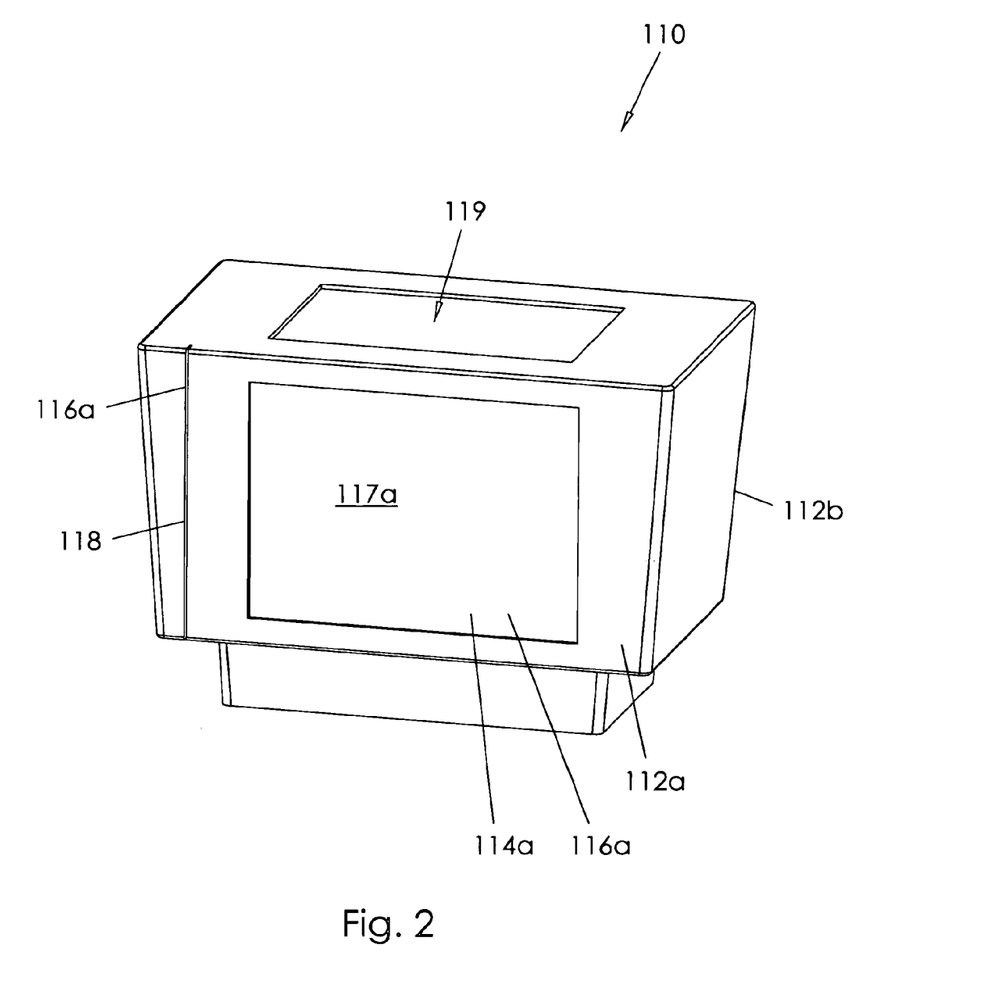
FIG. 2 is an isolated perspective view of a kiosk as in FIG. 1.

As shown in FIGS. 1 and 2, the electronic kiosk 110 may define a storage area 119 configured to hold napkins or condiments (including such typical condiments as salt, pepper, and ketchup and such bar condiments as limes, olives, and straws, among others). The electronic kiosk 110 may include a transmitter 122 and/or a receiver 124 (FIG. 6). A processor 125 may be in data communication with the displays 114a, 114b, the input devices 116a, 116b, the transmitter 122, and the receiver 124 (FIG. 6). Means for introducing programming to the processor 125 may be included, such as a connection (e.g., hard wired or wireless) to a network 125a (FIG. 6) or a removable memory device, for example.

Alternatively, the electronic kiosk 110 may include only a first display 114a for use by the consumer. This embodiment may be adequately explained with reference to FIG. 1-2 and 7b. The kiosk 110 would also include the kiosk processor 125 in communication with the first display 114a for actuating the first display 114a. Preferably, the processor 125 would include programming enabling the first display 114a to display pictures or descriptions of menu items or other options as will be described later. In this embodiment, the kiosk 110 also defines a storage area 119 configured to hold napkins or condiments as described previously. It is understood that a kiosk 110 with a first display 114a and storage area 119 for customer use may be used independently or in combination with the other unique elements of a restaurant system as will be described later in greater detail.

Figure 3A:
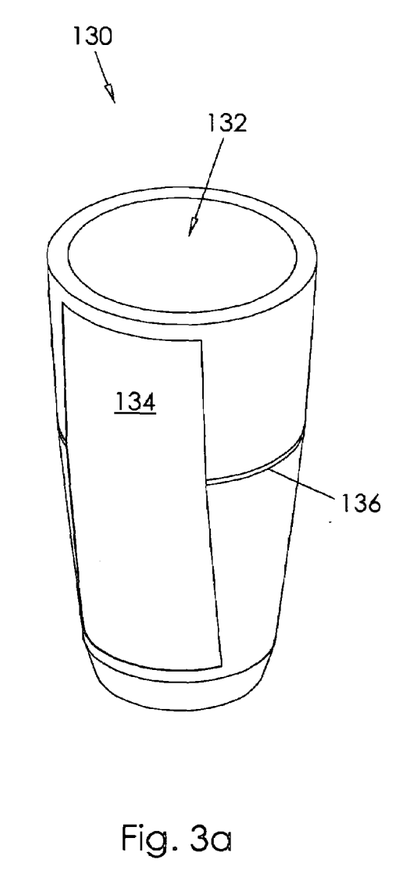
FIG. 3a is an isolated perspective view of a mixing tin as in FIG. 1.
Figure 3B:
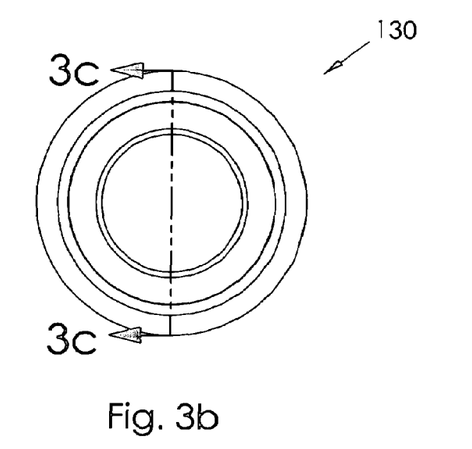
FIG. 3b is a top view of the mixing tin as in FIG. 3b.
Figure 3C:
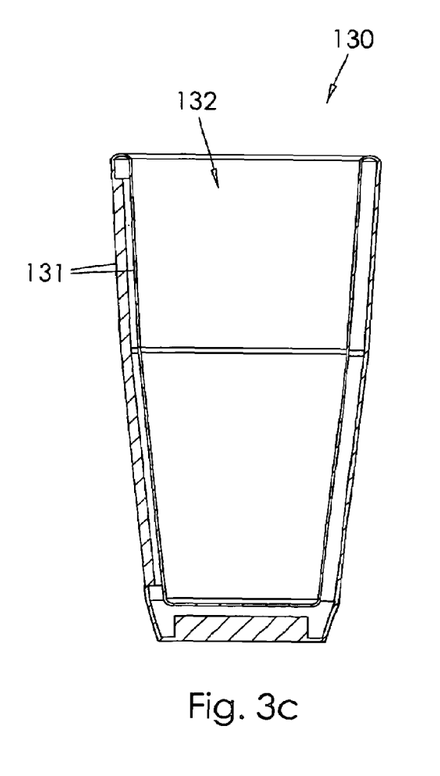
FIG. 3c is a sectional view taken along line 3c-3c of FIG. 3b.
Figure 4A:
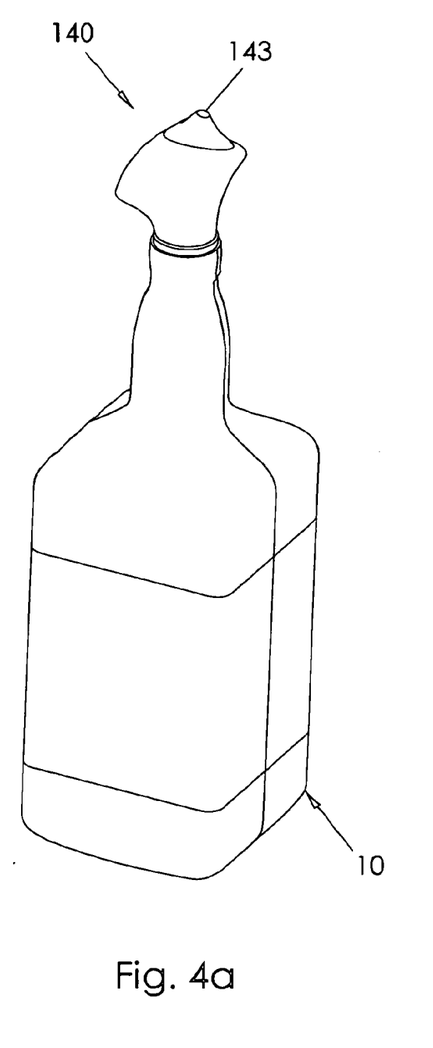
FIG. 4a is a perspective view on an enlarged scale of a lighted pour spout device as in FIG. 1.
Figure 4B:
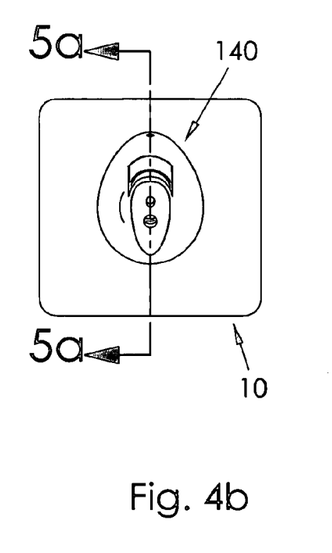
Figures 5A, 5B:
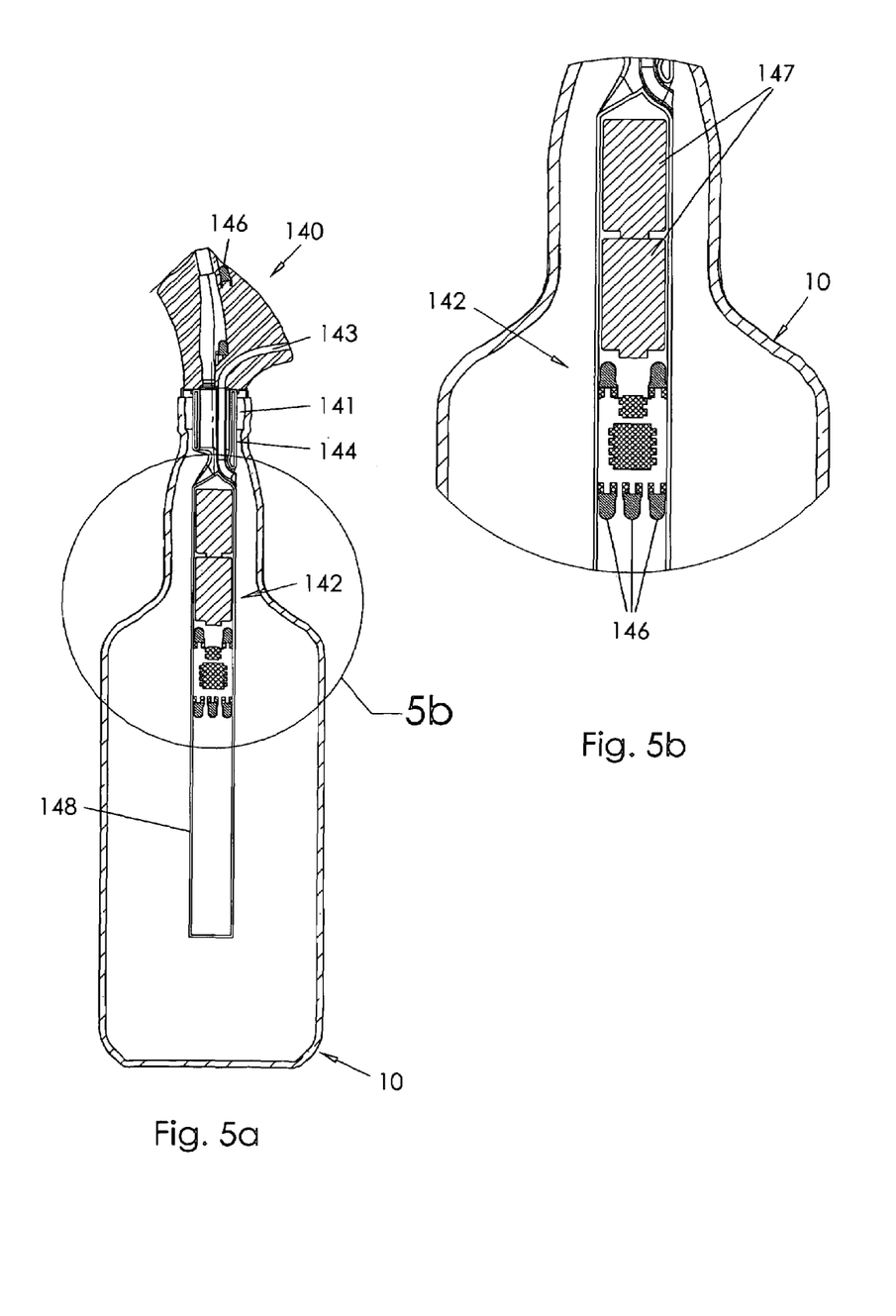

The restaurant system 100 may include a mixing tin 130 as shown in FIGS. 3a through 3c. The mixing tin 130 may include a housing with a double wall construction (i.e., two walls 131 spaced apart in a waterproof manner) that defines a mixing area 132. The mixing tin 130 may include a display 134 (e.g., a LCD display, etc.), and the display 134 may be sandwiched between the walls 131 for durability. If sandwiched between the walls 131, an outer wall 131 may include a transparent material so that the display 134 may be seen from outside the mixing area 132. The mixing tin 130 may include at least one light 136 (e.g., a LED, etc.), and a processor 135 may be in data communication with the display 134 and the light(s) 136 for actuating the display 134 and the light(s) 136 (FIG. 6). It is understood that various other lighting options are possible, such as means for continual or periodic "backlighting". Means for providing data to the mixing tin processor 135 may be included. More particularly, the mixing tin 130 may include a receiver 137 in data communication with the processor 135 for receiving data from the kiosk transmitter 122 (FIG. 6), and/or the mixing tin 130 may include a removable memory device 138, for example. In this regard, data such as drink recipes may be received and displayed on the display so as to aid a bartender in preparing drinks for customers.

As shown in FIGS. 4a through 6, the restaurant system 100 may include a pour spout 140 for use with a bottle 10 containing a fluid (e.g., a bottle of alcohol, mixer, cooking oil, etc.). The pour spout 140 includes a coupling portion 141 that has a configuration complementary to a configuration of the bottle 10 so that the coupling portion 141 may be selectively attached to the bottle 10. The coupling portion 141 may fit inside the bottle 10 similar to a cork, or the bottle may be threaded and the coupling portion 141 may attach to the bottle threads, for example. An interior portion 142 of the pour spout 140 is configured to extend inside the bottle 10, and the interior portion 142 and the coupling portion 141 collectively define a through opening 143 for dispensing the fluid from inside the bottle 10. A valve 144 (e.g., a variable flow valve, etc.) may be in communication with the through opening 143 to restrict the dispensing of the fluid from inside the bottle 10.

The interior portion 142 may include at least one light 146 (e.g., a LED, etc.) and a battery 147 in electrical communication with the light(s) 146. As shown in FIG. 6, a processor 145 may be in data communication with the light(s) 146 for selectively actuating the light(s) 146. The interior portion 142 may include a translucent material to allow the light(s) 146 to illuminate an extended area (e.g., an area larger than would otherwise be lit), and the interior portion 142 may display advertising indicia. More particularly, the interior portion 142 may include advertising indicia 148 (e.g., printed thereon, etched thereon, formed therein, etc.), or a transparent sleeve that includes advertising indicia may be positionable about the interior portion 142. Other backlighting light configurations are also contemplated.

Means for providing data to the pour spout processor 145 may be included. More particularly, the pour spout 140 may include a receiver 147 in data communication with the processor 145 for receiving data from the kiosk transmitter 122 (FIG. 6), and/or the pour spout 140 may include a removable memory device, for example. Though not shown in the accompanying drawings, the pour spout 140 may include a display (e.g., a LCD display, etc.) in data communication with the pour spout processor 145.

The restaurant system 100 may include a headset 150 as shown in FIGS. 1 and 6. The headset 150 may include a speaker 152, a receiver 154 for receiving data from the kiosk transmitter 122, and a processor 155 in data communication with the speaker 152 and the receiver 154. A microphone 156 may be in data communication with the headset processor 155, and a transmitter 157 may be in data communication with the headset processor 155 (FIG. 6). The headset 150 enables drink recipes or the like to be transmitted from the kiosk transmitter 122 to the headset receiver 154 and played through the headset speakers 152, thus assisting the bartender in mixing selected/ordered drinks (FIG. 6). The headset 150 is also important in enabling a waiter to be summoned, as described below.

While the transmitters and receivers described herein may utilize active or passive RFID technology, it should be appreciated that other more traditional data transmission systems as well as those employed in the future may also be appropriate.

Figure 8:
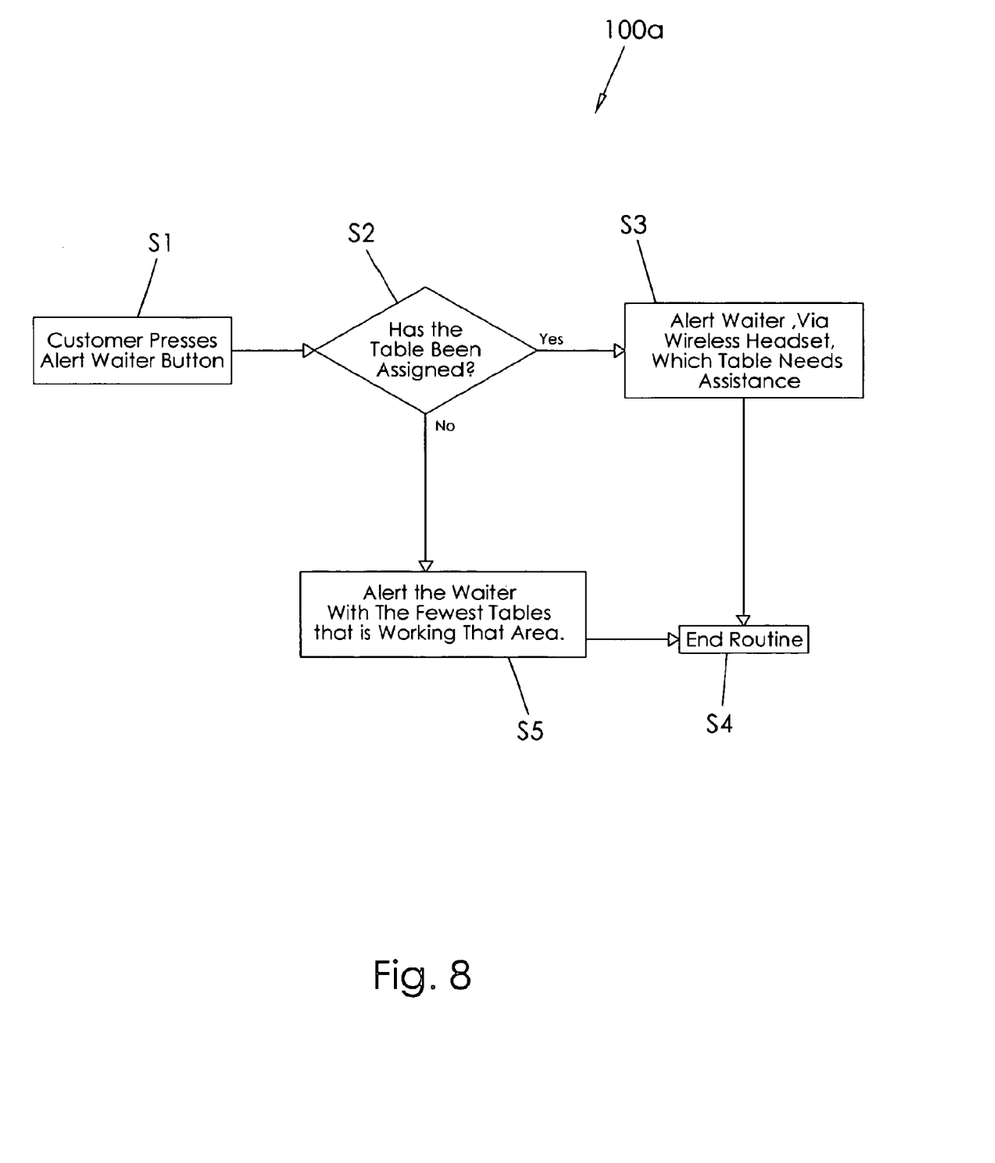
FIG. 8 is a flowchart illustrating one exemplary method for using the restaurant system according to the present invention.

FIG. 8 shows one exemplary method 100a of using the restaurant system 100. At a first step S1, a customer utilizes the input device 116a to request waiter assistance. The kiosk processor 125 (or another appropriate processor) determines if the customer's table has been assigned to a waiter at step S2. If so, the method proceeds to step S3 where the kiosk processor 125 actuates the kiosk transmitter 122 to send data to the headset receiver 154 worn by the appropriate waiter. The headset processor 155 may then actuate the speaker 152 to alert the waiter. The method then ends at step S4. If the customer's table has not been assigned to a waiter, the method instead proceeds to step S5 where the kiosk processor 125 actuates the kiosk transmitter 122 to send data to the headset receiver 154 worn by the waiter closest to the table. The headset processor 155 may then actuate the speaker 152 to alert the waiter. The method then ends at step S4.

Figure 9:
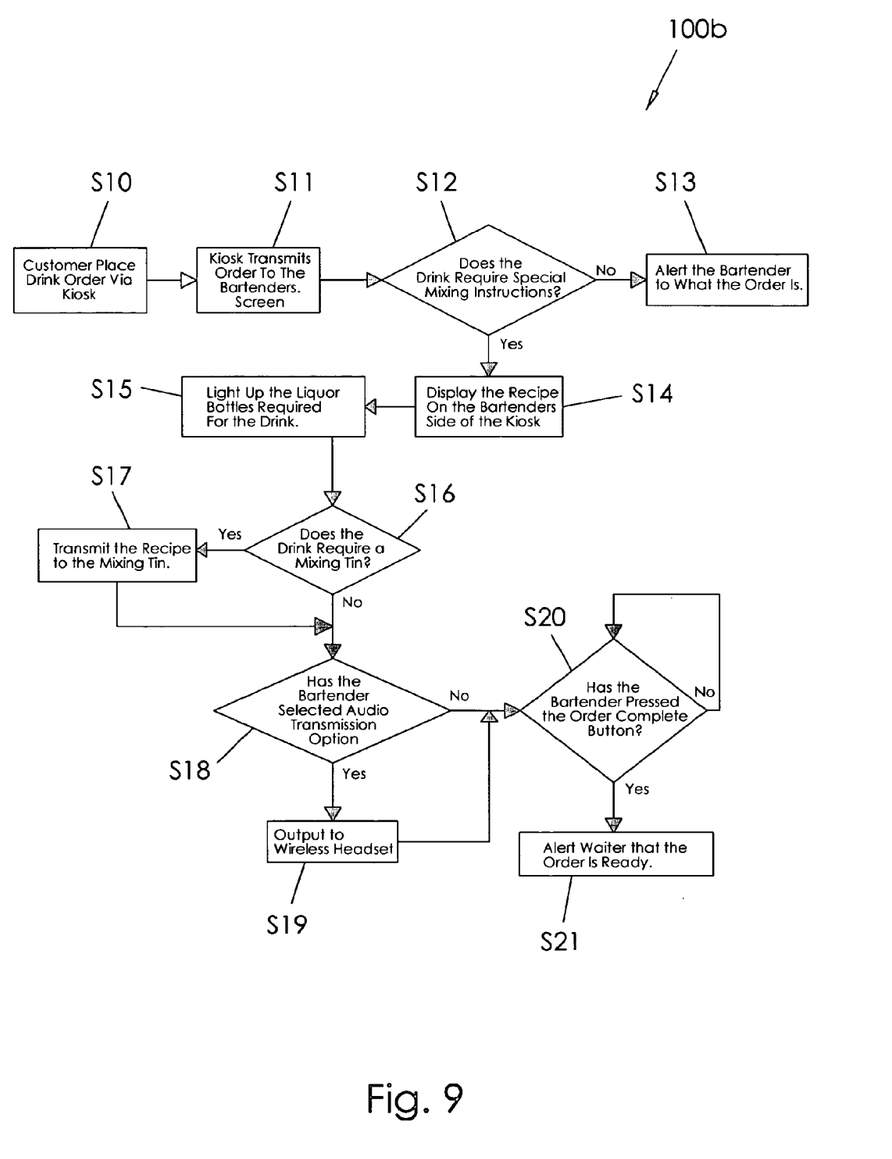
FIG. 9 is a flowchart illustrating another exemplary method for using the restaurant system according to the present invention.

FIG. 9 shows another exemplary method 100b of using the restaurant system 100. At step S10, a customer utilizes the input device 116a to place a drink order. The method proceeds to step S11, where the kiosk processor 125 receives the data from the input device 116a and actuates the display 114b so that a bartender may see the order. The kiosk processor 125 may also actuate the display 114a so that the customer may see the order. Additionally, or alternately, the kiosk processor 125 may actuate the display 114a to provide advertising or programming chosen by the customer (as shown in FIG. 7b, for example). The method then proceeds to step S12, where the kiosk processor 125 determines if the drink the customer ordered requires special mixing instructions. If not, the method proceeds to step S13; if so, the method proceeds to step S14.

At step S13, the kiosk processor 125 actuates the kiosk transmitter 122 to transmit data about the drink order to the bartender. The data may be received by the mixing tin receiver 137, and the mixing tin processor 135 may actuate the mixing tin display 134 to convey the drink order to the bartender. Alternately, or additionally, the data may be received by the headset receiver 154, and the headset processor 155 may actuate the headset speaker 152 to convey the drink order to the bartender. The method then ends.

At step S14, the kiosk processor 125 actuates the kiosk display 114b to display the recipe of the drink. The method then proceeds to step S15. At step S15, the kiosk processor 125 actuates the kiosk transmitter 122 to transmit data corresponding to the drink recipe. The pour spout receiver 147 corresponding to the bottle needed to make the drink may receive the recipe data from the kiosk transmitter 122, and the pour spout processor 145 may actuate the pour spout light(s) 146 and/or the pour spout display. Activation of the pour spout light(s) and/or the pour spout display may be considered "back-lighting", though this need not be the case. The method then proceeds to step S16. At step S16, the kiosk processor 125 determines if the drink recipe requires a mixing tin. If so, the method proceeds to step S17; if not, the method proceeds to step S18.

At step S17, the kiosk processor 125 actuates the kiosk transmitter 122 to transmit drink recipe data to the mixing tin receiver 137. The mixing tin receiver 137 may then receive the drink recipe data, and the mixing tin processor 135 may actuate the mixing tin display 134 to convey the drink recipe to the bartender. Activation of the mixing tin display 134 may be considered "back-lighting", though this need not be the case. The mixing tin processor 135 may also (or alternately) actuate the mixing tin light(s) 136. The method then continues to step S18.

At step S18, the kiosk processor 125 determines if the bartender has chosen to receive an audio transmission of the drink recipe. If so, the method proceeds to step S19; if not, the method proceeds to step S20.

At step S19, the kiosk processor 125 actuates the kiosk transmitter 122 to transmit drink recipe data to the headset receiver 154. The headset receiver 154 may then receive the drink recipe data, and the headset processor 155 may actuate the headset speaker 152 to convey the drink recipe to the bartender. The method then continues to step S20.

At step S20, the kiosk processor 125 may determine if the bartender has used the input device 116b to indicate that the drink order has been filled. If not, the method may stay at step S20; if so, the method may continue to step S21. At step S21, the kiosk processor 125 may cause the kiosk display 114a to indicate that the drink has been served. If a waiter is using the kiosk 110 instead of a customer, the kiosk display 114a may indicate to the waiter that the drink is ready to serve.

In yet another exemplary method of using the restaurant system 100, the bartender may speak into the headset microphone 156, and the headset processor 155 may actuate the headset transmitter 157 to transmit data to the kiosk receiver 124. The headset processor 155 may include instructions to recognize the data and proceed accordingly. For example, the bartender may request a recipe for a drink, the headset transmitter 157 may transmit data corresponding to that request, the kiosk receiver 124 may receive the request, and the kiosk processor 125 may understand the request and provide the instructions to the bartender.

It is understood that while certain forms of this invention have been illustrated and described, it is not limited thereto except insofar as such limitations are included in the following claims and allowable functional equivalents thereof.

The invention claimed is:

1. A restaurant system, comprising:
   an electronic kiosk having:
   a base configured to be supported on a table;
   generally opposed first and second sides attached to said base;
   a first display on said first side for use by a customer;
   a second display on said second side for use by a bartender;
   a first input device for use by a customer;
   a processor in data communication with said first and second displays and said first input device for receiving data from said first input device and actuating said first and second displays; and
   wherein:
   said first and second sides extend upwardly from said base and are connected by side walls so as to form a housing enclosing said first and second displays atop said base;
   said housing defines a storage area extending between said first and second sides of said housing and having an open top such that said housing is accessible by the customer using said first display and the bartender using said second display, said storage area being configured to hold at least one of a napkin or a condiment; and
   said first and second sides, said storage area, said first display, said base, and said second display are configured in a unitary construction.

2. The restaurant system as in claim 1, wherein said first display and said first input device is a touch screen.

3. The restaurant system as in claim 1, wherein said first input device includes a card reader for receiving payment.

4. The restaurant system as in claim 1, further comprising means for introducing programming to said processor.

5. The restaurant system as in claim 1, wherein:
said kiosk includes a transmitter;
said kiosk processor is in data communication with said kiosk transmitter for actuating said kiosk transmitter to transmit data; and
said restaurant system further comprises a mixing tin defining a mixing area and having a display, a receiver for receiving data from said kiosk transmitter, and a processor in data communication with said mixing tin display and said mixing tin receiver;
wherein said data received by said mixing tin receiver includes drink order data and drink recipe data corresponding to said drink order data;
wherein said mixing tin processor automatically actuates said mixing tin display to display said drink recipe data received by said mixing tin receiver without any action by a user.

6. The restaurant system as in claim 5, wherein:
said kiosk processor includes programming for actuating said kiosk transmitter to transmit data corresponding to said data received from said first input device;
said kiosk transmitter is a RFID transmitter; and
said mixing tin receiver is a RFID receiver.

7. The restaurant system as in claim 5, wherein said mixing tin includes at least one LED in data communication with said mixing tin processor.

8. The restaurant system as in claim 5, wherein said mixing tin includes a waterproof double wall construction and said mixing tin display is sandwiched between said mixing tin walls.

9. The restaurant system as in claim 5, further comprising a pour spout having a configuration complementary to a configuration of a bottle for attachment of said pour spout to the bottle; said pour spout having a through opening for dispensing a fluid from inside a bottle; and
wherein said pour spout includes a light, a receiver for receiving data from said kiosk transmitter, and a processor in data communication with said pour spout light and said pour spout receiver.

10. The restaurant system as in claim 9, wherein:
said pour spout has an interior portion for extending inside a bottle;
said interior portion includes said pour spout light and a battery in electrical communication with said pour spout light;
said interior portion includes a translucent material to allow said pour spout light to illuminate an extended area;
said pour spout interior portion includes advertising indicia or a transparent sleeve including advertising indicia is positionable about said pour spout interior portion; and
said restaurant system further comprises a headset having a speaker, a receiver for receiving data from said kiosk transmitter, and a processor in data communication with said headset speaker and said headset receiver.

11. The restaurant system as in claim 1, wherein:
said kiosk includes a transmitter;
said kiosk processor is in data communication with said kiosk transmitter for actuating said kiosk transmitter to transmit data; and
said restaurant system further comprises a pour spout having a configuration complementary to a configuration of a bottle for attachment of said pour spout to the bottle, said pour spout having a through opening for dispensing a fluid from inside a bottle, said pour spout having a light, a receiver for receiving data from said kiosk transmitter, and a processor in data communication with said pour spout light and said pour spout receiver.

12. The restaurant system as in claim 11, wherein:
said pour spout has an interior portion for extending inside a bottle;
said interior portion includes said pour spout light and a battery in electrical communication with said pour spout light; and
said interior portion includes a translucent material to allow said pour spout light to illuminate an extended area.

13. The restaurant system as in claim 12, wherein said pour spout interior portion includes advertising indicia or a transparent sleeve including advertising indicia is positionable about said pour spout interior portion.

14. The restaurant system as in claim 1, wherein:
said kiosk includes a transmitter;
said kiosk processor is in data communication with said kiosk transmitter for actuating said kiosk transmitter to transmit data; and
said restaurant system further comprises a headset having a speaker, a receiver for receiving data from said kiosk transmitter, and a processor in data communication with said headset speaker and said headset receiver.

15. The restaurant system as in claim 14, wherein:
said kiosk includes a receiver in data communication with said kiosk processor;
said headset includes a microphone in data communication with said headset processor; and
said headset includes a transmitter in data communication with said headset processor.

16. A restaurant system, comprising:
an electronic kiosk having:
 a base configured to be supported on a table;
 generally opposed first and second sides attached to said base;
 a first display on said first side for use by a customer;
 a second display on said second side for use by a bartender;
 a first input device for use by a customer to submit drink order data;
 a processor in data communication with said first and second displays and said first input device for receiving data from said first input device and actuating said first and second displays;
wherein:
 said first and second sides extend upwardly from said base and are connected by side walls so as to form a housing enclosing said first and second displays atop said base;
 said housing defines a storage area extending between said first and second displays and having an open top such that said housing is accessible by the customer using said first display, said storage area being configured to hold at least one of a napkin or a condiment;
 said storage area, said first side, said first display, said base, said second side, and said second display, are configured in a unitary construction;
wherein:
 said kiosk includes a transmitter;
 said kiosk processor is in data communication with said kiosk transmitter for actuating said kiosk transmitter to transmit said drink order data and drink recipe data associated with said drink order data; and a mixing tin defining a mixing area and having a display, a receiver for receiving data from said kiosk transmitter, and a processor in data communication with said mixing tin display and said mixing tin receiver, said mixing tin processor automatically actuating said mixing tin display to display said drink recipe data associated with said drink order data without any action of a user.

17. The restaurant system as in claim 16, further comprising:

a pour spout having a configuration complementary to a configuration of a bottle for attachment of said pour spout to the bottle; said pour spout having a through opening for dispensing a fluid from inside a bottle; and wherein said pour spout includes a light, a receiver for receiving data from said kiosk transmitter, and a processor in data communication with said pour spout light and said pour spout receiver.

18. The restaurant system as in claim 17, further comprising a headset having a speaker, a receiver for receiving data from said kiosk transmitter, and a processor in data communication with said headset speaker and said headset receiver.

* * * * *